(12) United States Patent
Lin et al.

(10) Patent No.: US 7,009,739 B1
(45) Date of Patent: Mar. 7, 2006

(54) COLOR TO BLACK AND WHITE CONVERTER

(75) Inventors: Ying-wei Lin, Penfield, NY (US); Jeng-nan Shiau, Webster, NY (US)

(73) Assignee: Xerox Corporation, Stamford, CT (US)

( * ) Notice: Subject to any disclaimer, the term of this patent is extended or adjusted under 35 U.S.C. 154(b) by 1176 days.

(21) Appl. No.: 09/699,820

(22) Filed: Oct. 30, 2000

(51) Int. Cl.
*H04N 1/46* (2006.01)

(52) U.S. Cl. .................. 358/500; 358/1.9; 358/3.06; 358/3.2; 358/534

(58) Field of Classification Search ............. 358/1.9, 358/500, 3.06, 3.2, 534
See application file for complete search history.

(56) References Cited

U.S. PATENT DOCUMENTS

| | | | |
|---|---|---|---|
| 4,149,194 A | | 4/1979 | Holladay |
| 4,458,002 A | * | 7/1984 | Janssens et al. ............ 430/236 |
| 4,903,048 A | | 2/1990 | Harrington |
| 5,153,576 A | * | 10/1992 | Harrington .................. 345/596 |
| 5,291,310 A | * | 3/1994 | Levien ....................... 358/3.2 |
| 5,315,406 A | * | 5/1994 | Levien ....................... 358/3.2 |
| 5,365,602 A | | 11/1994 | Levien |
| 5,588,093 A | | 12/1996 | Harrington |
| 5,598,204 A | | 1/1997 | Harrington |
| 5,625,716 A | * | 4/1997 | Borg ......................... 382/254 |
| 5,680,230 A | | 10/1997 | Kaburagi et al. |

(Continued)

FOREIGN PATENT DOCUMENTS

EP   0 473 433 A2   3/1992

(Continued)

OTHER PUBLICATIONS

European Search Report, Place of Search—The Hague, Date of Completion of Search—Sep. 15, 2003.

*Primary Examiner*—Kimberly Williams
*Assistant Examiner*—Michael Burleson
(74) *Attorney, Agent, or Firm*—Fay, Sharpe, Fagan, Minnich & McKee, LLP

(57) ABSTRACT

A continuously variable screening tool is used to generate a unique texture pattern for every color in a multicolor image. The continuously variable screening tool allows a single colorant version of the image to be generated with less information loss than typically suffered in the multicolor to single color transformation process. The continuously variable screening tool is generated by blending patterns from a set of reference screens. The reference screens are associated with selected reference colors in, for example, a machine independent color space. A calculated screen is generated through a weighted blend of reference screens located near the arbitrary color in the machine independent color space. Typically, the weights depend on the distance the arbitrary color is from each of the reference colors. The screens consist of arrays of threshold values. Each threshold value is associated with a dot position and an image pixel. Where a pixel value exceeds the associated threshold value, provision is made to place a mark in the associated dot position. An image processor operative to carry out the method comprises a continuously variable screening tool generator. An embodiment of the image processor includes a reference screen storage device and a screen blender.

20 Claims, 12 Drawing Sheets

U.S. PATENT DOCUMENTS

| | | |
|---|---|---|
| 5,701,401 A | 12/1997 | Harrington et al. |
| 5,917,614 A * | 6/1999 | Levien ....................... 358/3.03 |
| 5,956,157 A * | 9/1999 | Tai ............................ 358/3.24 |
| 5,978,011 A * | 11/1999 | Jacob et al. ................ 347/251 |
| 6,014,233 A | 1/2000 | Fan et al. |
| 6,078,687 A | 6/2000 | Venkateswar |
| 6,204,934 B1 * | 3/2001 | Minamino ................... 358/1.9 |
| 6,445,465 B1 * | 9/2002 | Samworth ................... 358/1.9 |
| 6,463,173 B1 | 10/2002 | Tretter |
| 6,556,311 B1 | 4/2003 | Benear et al. |

FOREIGN PATENT DOCUMENTS

| | | |
|---|---|---|
| EP | 0 711 068 A2 | 5/1996 |
| EP | 0 823 811 A2 | 2/1998 |
| JP | 11-069156 A | 3/1999 |

* cited by examiner

|     | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0 | 10 | 37 | 79 | 127 | 176 | 218 | 245 | 255 | 245 | 218 | 176 | 128 | 79 | 37 | 10 |
| 2 | 10 | 19 | 44 | 82 | 127 | 173 | 211 | 236 | 245 | 236 | 211 | 173 | 128 | 82 | 44 | 19 |
| 3 | 37 | 44 | 64 | 93 | 128 | 162 | 191 | 211 | 218 | 211 | 191 | 162 | 128 | 93 | 64 | 44 |
| 4 | 79 | 82 | 93 | 109 | 128 | 146 | 162 | 173 | 176 | 173 | 162 | 146 | 128 | 109 | 93 | 82 |
| 5 | 127 | 127 | 128 | 128 | 128 | 128 | 128 | 128 | 128 | 128 | 128 | 128 | 128 | 128 | 128 | 127 |
| 6 | 176 | 173 | 162 | 146 | 128 | 109 | 93 | 82 | 79 | 82 | 93 | 109 | 127 | 146 | 162 | 173 |
| 7 | 218 | 211 | 191 | 162 | 128 | 93 | 64 | 44 | 37 | 44 | 64 | 93 | 127 | 162 | 191 | 211 |
| 8 | 245 | 236 | 211 | 173 | 128 | 82 | 44 | 19 | 10 | 19 | 44 | 82 | 127 | 173 | 211 | 236 |
| 9 | 255 | 245 | 218 | 176 | 128 | 79 | 37 | 10 | 0 | 10 | 37 | 79 | 127 | 176 | 218 | 245 |
| 10 | 245 | 236 | 211 | 173 | 128 | 82 | 44 | 19 | 10 | 19 | 44 | 82 | 127 | 173 | 211 | 236 |
| 11 | 218 | 211 | 191 | 162 | 128 | 93 | 64 | 44 | 37 | 44 | 64 | 93 | 127 | 162 | 191 | 211 |
| 12 | 176 | 173 | 162 | 146 | 128 | 109 | 93 | 82 | 79 | 82 | 93 | 109 | 127 | 146 | 162 | 173 |
| 13 | 128 | 128 | 128 | 128 | 128 | 127 | 127 | 127 | 127 | 127 | 127 | 127 | 128 | 128 | 128 | 128 |
| 14 | 79 | 82 | 93 | 109 | 128 | 146 | 162 | 173 | 176 | 173 | 162 | 146 | 128 | 109 | 93 | 82 |
| 15 | 37 | 44 | 64 | 93 | 128 | 162 | 191 | 211 | 218 | 211 | 191 | 162 | 128 | 93 | 64 | 44 |
| 16 | 10 | 19 | 44 | 82 | 127 | 173 | 211 | 236 | 245 | 236 | 211 | 173 | 128 | 82 | 44 | 19 |

$S_0$

|     | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0 | 10 | 37 | 79 | 127 | 176 | 218 | 245 | 255 | 245 | 218 | 176 | 128 | 79 | 37 | 10 |
| 2 | 10 | 37 | 79 | 127 | 176 | 218 | 245 | 255 | 245 | 218 | 176 | 128 | 79 | 37 | 10 | 0 |
| 3 | 37 | 79 | 127 | 176 | 218 | 245 | 255 | 245 | 218 | 176 | 128 | 79 | 37 | 10 | 0 | 10 |
| 4 | 79 | 127 | 176 | 218 | 245 | 255 | 245 | 218 | 176 | 128 | 79 | 37 | 10 | 0 | 10 | 37 |
| 5 | 127 | 176 | 218 | 245 | 255 | 245 | 218 | 176 | 128 | 79 | 37 | 10 | 0 | 10 | 37 | 79 |
| 6 | 176 | 218 | 245 | 255 | 245 | 218 | 176 | 128 | 79 | 37 | 10 | 0 | 10 | 37 | 79 | 127 |
| 7 | 218 | 245 | 255 | 245 | 218 | 176 | 128 | 79 | 37 | 10 | 0 | 10 | 37 | 79 | 127 | 176 |
| 8 | 245 | 255 | 245 | 218 | 176 | 128 | 79 | 37 | 10 | 0 | 10 | 37 | 79 | 127 | 176 | 218 |
| 9 | 255 | 245 | 218 | 176 | 128 | 79 | 37 | 10 | 0 | 10 | 37 | 79 | 127 | 176 | 218 | 245 |
| 10 | 245 | 218 | 176 | 128 | 79 | 37 | 10 | 0 | 10 | 37 | 79 | 127 | 176 | 218 | 245 | 255 |
| 11 | 218 | 176 | 128 | 79 | 37 | 10 | 0 | 10 | 37 | 79 | 127 | 176 | 218 | 245 | 255 | 245 |
| 12 | 176 | 128 | 79 | 37 | 10 | 0 | 10 | 37 | 79 | 127 | 176 | 218 | 245 | 255 | 245 | 218 |
| 13 | 128 | 79 | 37 | 10 | 0 | 10 | 37 | 79 | 127 | 176 | 218 | 245 | 255 | 245 | 218 | 176 |
| 14 | 79 | 37 | 10 | 0 | 10 | 37 | 79 | 127 | 176 | 218 | 245 | 255 | 245 | 218 | 176 | 128 |
| 15 | 37 | 10 | 0 | 10 | 37 | 79 | 127 | 176 | 218 | 245 | 255 | 245 | 218 | 176 | 128 | 79 |
| 16 | 10 | 0 | 10 | 37 | 79 | 127 | 176 | 218 | 245 | 255 | 245 | 218 | 176 | 128 | 79 | 37 |

$S_1$

|     | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0 | 10 | 37 | 79 | 127 | 176 | 218 | 245 | 255 | 245 | 218 | 176 | 128 | 79 | 37 | 10 |
| 2 | 10 | 0 | 10 | 37 | 79 | 127 | 176 | 218 | 245 | 218 | 176 | 128 | 79 | 37 | 10 | 0 |
| 3 | 37 | 10 | 0 | 10 | 37 | 79 | 127 | 176 | 218 | 176 | 128 | 79 | 37 | 10 | 0 | 10 |
| 4 | 79 | 37 | 10 | 0 | 10 | 37 | 79 | 127 | 176 | 128 | 79 | 37 | 10 | 0 | 10 | 37 |
| 5 | 127 | 79 | 37 | 10 | 0 | 10 | 37 | 79 | 127 | 79 | 37 | 10 | 0 | 10 | 37 | 79 |
| 6 | 176 | 127 | 79 | 37 | 10 | 0 | 10 | 37 | 79 | 37 | 10 | 0 | 10 | 37 | 79 | 127 |
| 7 | 218 | 176 | 127 | 79 | 37 | 10 | 0 | 10 | 37 | 10 | 0 | 10 | 37 | 79 | 127 | 176 |
| 8 | 245 | 218 | 176 | 127 | 79 | 37 | 10 | 0 | 10 | 0 | 10 | 37 | 79 | 127 | 176 | 218 |
| 9 | 255 | 245 | 218 | 176 | 127 | 79 | 37 | 10 | 0 | 10 | 37 | 79 | 127 | 176 | 218 | 245 |
| 10 | 245 | 218 | 176 | 128 | 79 | 37 | 10 | 0 | 10 | 0 | 10 | 37 | 79 | 127 | 176 | 218 |
| 11 | 218 | 176 | 128 | 79 | 37 | 10 | 0 | 10 | 37 | 10 | 0 | 10 | 37 | 79 | 127 | 176 |
| 12 | 176 | 128 | 79 | 37 | 10 | 0 | 10 | 37 | 79 | 37 | 10 | 0 | 10 | 37 | 79 | 127 |
| 13 | 128 | 79 | 37 | 10 | 0 | 10 | 37 | 79 | 127 | 79 | 37 | 10 | 0 | 10 | 37 | 79 |
| 14 | 79 | 37 | 10 | 0 | 10 | 37 | 79 | 127 | 176 | 127 | 79 | 37 | 10 | 0 | 10 | 37 |
| 15 | 37 | 10 | 0 | 10 | 37 | 79 | 127 | 176 | 218 | 176 | 127 | 79 | 37 | 10 | 0 | 10 |
| 16 | 10 | 0 | 10 | 37 | 79 | 127 | 176 | 218 | 245 | 218 | 176 | 127 | 79 | 37 | 10 | 0 |

|    | 1   | 2   | 3   | 4   | 5   | 6   | 7   | 8   | 9   | 10  | 11  | 12  | 13  | 14  | 15  | 16  |
|----|-----|-----|-----|-----|-----|-----|-----|-----|-----|-----|-----|-----|-----|-----|-----|-----|
| 1  | 0   | 10  | 37  | 79  | 127 | 176 | 218 | 245 | 255 | 245 | 218 | 176 | 128 | 79  | 37  | 10  |
| 2  | 10  | 24  | 56  | 97  | 143 | 187 | 222 | 242 | 245 | 218 | 176 | 128 | 79  | 37  | 10  | 0   |
| 3  | 37  | 56  | 84  | 120 | 157 | 189 | 212 | 222 | 218 | 176 | 128 | 79  | 37  | 10  | 0   | 10  |
| 4  | 79  | 97  | 120 | 145 | 166 | 182 | 189 | 187 | 176 | 128 | 79  | 37  | 10  | 0   | 10  | 37  |
| 5  | 127 | 143 | 157 | 166 | 170 | 166 | 157 | 143 | 127 | 79  | 37  | 10  | 0   | 10  | 37  | 79  |
| 6  | 176 | 187 | 189 | 182 | 166 | 145 | 120 | 97  | 79  | 37  | 10  | 0   | 10  | 37  | 79  | 127 |
| 7  | 218 | 222 | 212 | 189 | 157 | 120 | 85  | 56  | 37  | 10  | 0   | 10  | 37  | 79  | 127 | 176 |
| 8  | 245 | 242 | 222 | 187 | 143 | 97  | 56  | 24  | 10  | 0   | 10  | 37  | 79  | 127 | 176 | 218 |
| 9  | 255 | 245 | 218 | 176 | 127 | 79  | 37  | 10  | 0   | 10  | 37  | 79  | 127 | 176 | 218 | 245 |
| 10 | 245 | 218 | 176 | 128 | 79  | 37  | 10  | 0   | 10  | 24  | 56  | 97  | 143 | 187 | 222 | 242 |
| 11 | 218 | 176 | 128 | 79  | 37  | 10  | 0   | 10  | 37  | 56  | 84  | 120 | 157 | 189 | 212 | 222 |
| 12 | 176 | 128 | 79  | 37  | 10  | 0   | 10  | 37  | 79  | 97  | 120 | 145 | 166 | 182 | 189 | 187 |
| 13 | 128 | 79  | 37  | 10  | 0   | 10  | 37  | 79  | 127 | 143 | 157 | 166 | 170 | 166 | 157 | 143 |
| 14 | 79  | 37  | 10  | 0   | 10  | 37  | 79  | 127 | 176 | 187 | 189 | 182 | 166 | 145 | 120 | 97  |
| 15 | 37  | 10  | 0   | 10  | 37  | 79  | 127 | 176 | 218 | 222 | 212 | 189 | 157 | 120 | 85  | 56  |
| 16 | 10  | 0   | 10  | 37  | 79  | 127 | 176 | 218 | 245 | 242 | 222 | 187 | 143 | 97  | 56  | 24  |

↖ _610_

|    | 1   | 2   | 3   | 4   | 5   | 6   | 7   | 8   | 9   | 10  | 11  | 12  | 13  | 14  | 15  | 16  |
|----|-----|-----|-----|-----|-----|-----|-----|-----|-----|-----|-----|-----|-----|-----|-----|-----|
| 1  | 0   | 10  | 37  | 79  | 127 | 176 | 218 | 245 | 255 | 245 | 218 | 176 | 128 | 79  | 37  | 10  |
| 2  | 10  | 22  | 52  | 92  | 137 | 182 | 218 | 240 | 245 | 224 | 187 | 143 | 95  | 52  | 21  | 6   |
| 3  | 37  | 52  | 77  | 111 | 147 | 180 | 205 | 218 | 218 | 187 | 149 | 106 | 67  | 37  | 21  | 21  |
| 4  | 79  | 92  | 111 | 133 | 153 | 170 | 180 | 182 | 176 | 143 | 106 | 73  | 49  | 36  | 37  | 52  |
| 5  | 127 | 137 | 147 | 153 | 156 | 153 | 147 | 138 | 128 | 95  | 67  | 49  | 42  | 49  | 67  | 95  |
| 6  | 176 | 182 | 180 | 170 | 153 | 133 | 111 | 92  | 79  | 52  | 37  | 36  | 49  | 73  | 106 | 142 |
| 7  | 218 | 218 | 205 | 180 | 147 | 111 | 78  | 52  | 37  | 21  | 21  | 37  | 67  | 106 | 148 | 187 |
| 8  | 245 | 240 | 218 | 182 | 138 | 92  | 52  | 22  | 10  | 6   | 21  | 52  | 95  | 142 | 187 | 224 |
| 9  | 255 | 245 | 218 | 176 | 127 | 79  | 37  | 10  | 0   | 10  | 37  | 79  | 127 | 176 | 218 | 245 |
| 10 | 245 | 224 | 187 | 143 | 95  | 52  | 21  | 6   | 10  | 22  | 52  | 92  | 137 | 182 | 218 | 240 |
| 11 | 218 | 187 | 149 | 106 | 67  | 37  | 21  | 21  | 37  | 52  | 77  | 111 | 147 | 180 | 205 | 218 |
| 12 | 176 | 143 | 106 | 73  | 49  | 36  | 37  | 52  | 79  | 92  | 111 | 133 | 153 | 170 | 180 | 182 |
| 13 | 128 | 95  | 67  | 49  | 42  | 49  | 67  | 95  | 127 | 137 | 147 | 153 | 156 | 153 | 147 | 138 |
| 14 | 79  | 52  | 37  | 36  | 49  | 73  | 106 | 142 | 176 | 182 | 180 | 170 | 153 | 133 | 111 | 92  |
| 15 | 37  | 21  | 21  | 37  | 67  | 106 | 148 | 187 | 218 | 218 | 205 | 180 | 147 | 111 | 78  | 52  |
| 16 | 10  | 6   | 21  | 52  | 95  | 142 | 187 | 224 | 245 | 240 | 218 | 182 | 138 | 92  | 52  | 22  |

COLOR TO BLACK AND WHITE CONVERTER

BACKGROUND OF THE INVENTION

1. Field of the Invention

The invention relates to the art of image rendering. It finds application where color images are rendered with a single colorant. For example, the invention finds application in repro-graphic machines where a color image is scanned and then transformed for rendering so that single colorant (black and white) copies of the color image can be made. The invention finds further application in general-purpose computing devices such as personal computers and business graphics authoring devices. In the latter devices, color images such as bar and pie charts are created in color and displayed on a computer display and then are printed on black and white printers through the use of the invention. All these devices and devices like them are referred to herein as image processors.

2. Description of Related Art

Communicating concepts and ideas to others can be difficult. One method often used to communicate ideas to a group of people is to make a visual presentation. In a visual presentation, images such as charts, graphs and photographs are often displayed before the audience while the speaker explains and describes the significance of the images. Alternatively, the images can act as summaries of an associated speech. Typically, the images are presented in color. Color often adds to the impact and clarity of an image. For example, a pie chart or a bar graph is easier to read if its various sections are presented in different colors.

Copies of visual presentation material are often distributed to the audience members. The distributed materials serve to document the presentation. The distributed material can help audience members follow the presentation and can serve as study aids and/or reference material.

Unfortunately, it can be impractical or prohibitively expensive to distribute a large number of color copies of presentation material. Furthermore, in some cases, color reproduction equipment is not readily available. In these cases, the color images are often reproduced in black and white.

Creating black and white versions of color images can be problematic. Typically, a great deal of information is lost in the conversion to black and white. For example, typical, color image authoring devices can produce over sixteen million different colors, while typical black and white rendering devices can only produce two hundred fifty six shades of gray. Obviously, a great number of colors must be mapped to each level of gray. Therefore, portions of a color image that are quite obviously different colors can appear to be the same color when the image is rendered in black and white. When the image portions in question are, for example, different sections of a pie chart, this loss of information can render the pie chart useless.

Attempts have been made to alleviate this problem by using texturing to increase the number of ways colors can be represented in a black and white image. Typically, under these strategies, the conversion to black and white is accomplished by dividing colors into a finite number of bins and assigning a different halftone pattern to each of the bins. This approach can preserve more information from the color image. However, this approach can also lead to abrupt transitions in the black and white image. Where colors in the original image smoothly blend from one color to another, the blend in color can cross a bin boundary, resulting in a sudden shift in a halftone pattern or level. This problem is particularly pronounced when colors are near neutral or gray. This situation can be further aggravated by the presence of noise in the image. For example, a subtle jitter or shift in the color in a photograph of a person's face can be transformed into dramatic changes in halftone patterns if the jitter or shift is across one or more bin boundary.

Therefore, a method for rendering a color image in black and white is desired that preserves more of the information present in a color image. Furthermore a method is desired that accurately portrays smooth or subtle transitions in color as equally smooth or subtle transitions in texture.

BRIEF SUMMARY OF THE INVENTION

To those ends, a method for generating a single colorant version of a multicolor image, that preserves color information in the image, has been developed. The method comprises the steps of generating a continuously variable screening tool operative to provide a unique texture corresponding to each hue and saturation in the color image, and transforming the multicolor description of the image through the continuously variable screening tool thereby creating a single-colorant description of the image.

In some embodiments, the step of generating a continuously variable screening tool further comprises defining a neutral screen associated with neutral color, defining a plurality of primary screens associated with a plurality of hues from the multi-colorant color space and generating a set of blended screens associated with a set of remaining hues by performing a weighted blend between nearby screens.

An image processor operative to use the method to render a single colorant version of a multicolor image comprises a continuously variable screening tool generator operative to generate a different screen texture for every hue and saturation in the multicolor image.

In some embodiments of the image processor, the continuously variable screening tool generator further comprises a reference screen storage device operative to store a set of predetermined reference screen patterns in association with locations within a color space and a screen blender operative to access the screen storage device and use the reference screens to calculate screen patterns for colors in the multicolor image that do not correspond to locations in the color space associated with the reference screens.

One advantage of the present invention resides in the ability to generate black and white versions of color images that preserve information coded in even subtle color differences.

Another advantage of the present invention is found in the ability to render different colors having the same luminance so that they can be distinguished in a black and white version of the image.

Yet another advantage of the present invention stems from the fact that it requires very little extra system resources such as, for example system memory.

A further advantage of the present invention is that it requires only a minimal amount of extra calculation and therefore can be carried out very quickly.

Still other advantages of the present invention will become apparent to those skilled in the art upon a reading and understanding of the detail description below.

BRIEF DESCRIPTION OF THE SEVERAL VIEWS OF THE DRAWINGS

The invention may take form in various components and arrangements of components, and in various steps and arrangements of steps. The drawings are only for purposes of illustrating preferred embodiments, they are not to scale, and are not to be construed as limiting the invention.

FIG. 5 shows numerical representations of some of the reference screens of FIG. 4;

FIG. 6 shows numerical representations of an intermediate and a final version of a calculated blended screen based in part on the reference screens of FIG. 5;

FIG. 7 is a diagram showing, in graphical form, the calculation of the blended screen of FIG. 6;

DETAILED DESCRIPTION OF THE INVENTION

Figure 1:
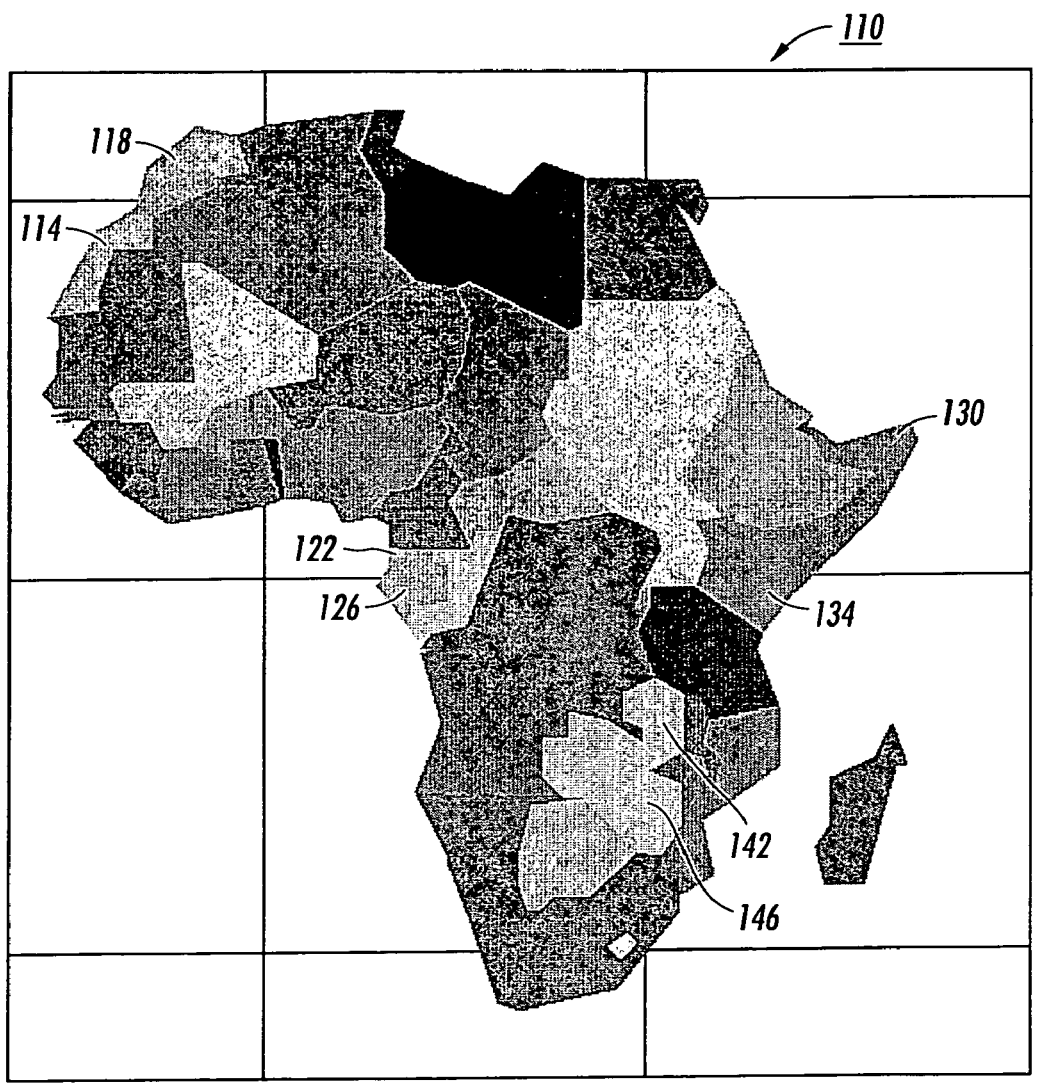
FIG. 1 is a black and white version of a color map rendered through the use of a prior art method by a prior art image processor.

Referring now to the drawings wherein the showings are for purposes of illustrating the invention and not for purpose of limiting the same thereto, FIG. 1 illustrates a black and white or single colorant version of a color map of Africa 110 produced by a prior art image processor by transforming colors to shades of gray. The transformation is accomplished, for example, by measuring or calculating a lightness level for each color in the image and then producing a shade of gray corresponding to each lightness level. This technique has drawbacks. For example, in the original color image (not shown), The Western Sahara and Morocco are clearly separate countries. The Western Sahara is rendered in yellow and Morocco is depicted in a light shade of cyan. However, in the prior art black and white version of the image of Africa 110, The Western Sahara 114 is almost indistinguishable from Morocco 118. Furthermore, in the prior art image of Africa 110, Equatorial Guinea 122 is indistinguishable from its neighbor Gabon 126 even though Equatorial Guinea is rendered in cyan and Gabon is shown in light brown in the original color image. Additionally, the originally green area designating Somalia 130 and the originally pink area designating Kenya 134 appear to be one medium gray country in the prior art map of Africa 110. Similarly, the prior art image processor has united the dark yellow area for Zambia 142 and the taupe area designating Zimbabwe 146.

Figure 2:
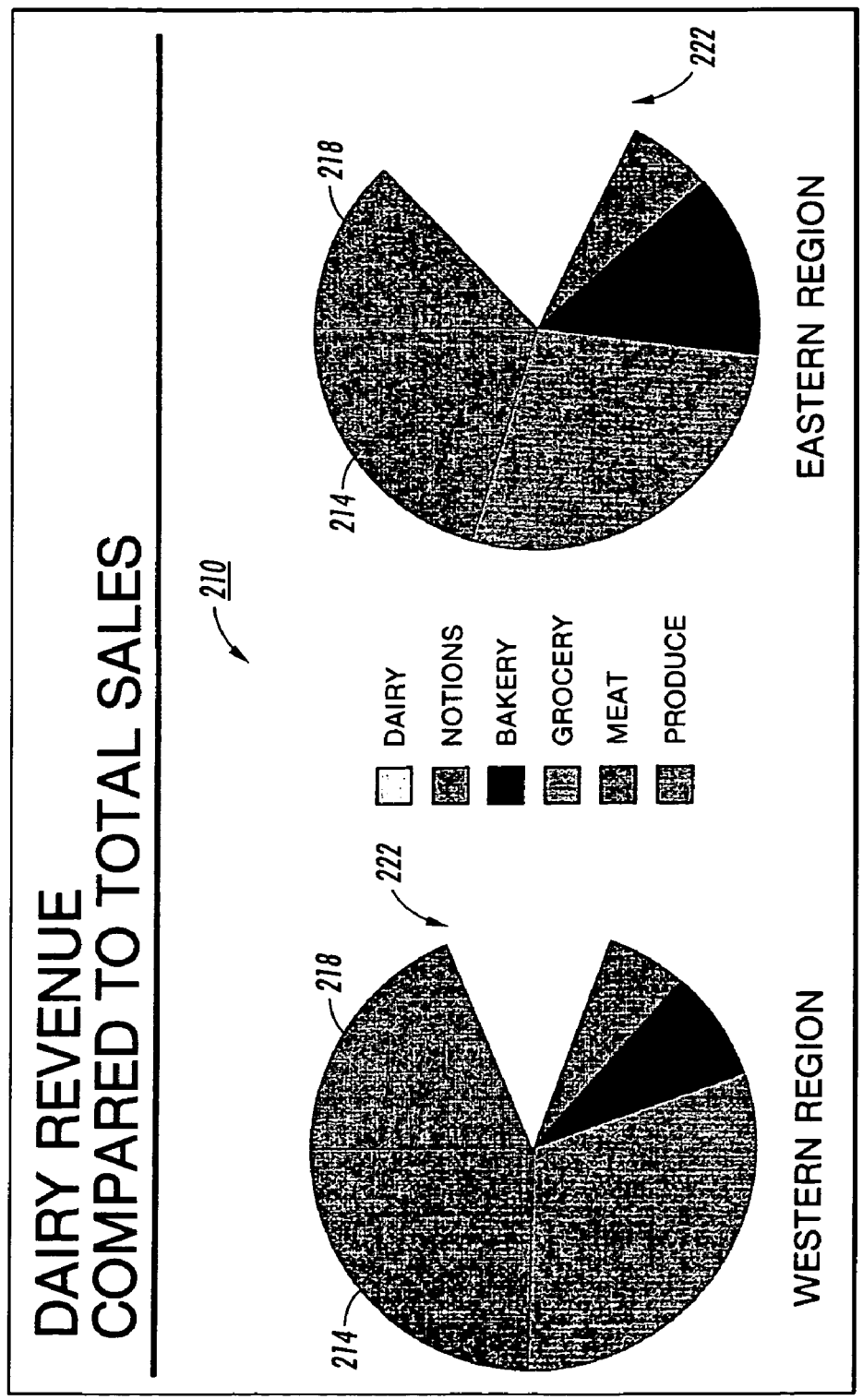
FIG. 2 is a black and white version of a color pie chart rendered through the use of a prior art method by a prior art image processor.

Referring to FIG. 2, in a prior art black and white or single colorant rendition 210 of a color pie chart (not shown), first pie wedges 214, originally rendered in red, and second pie wedges 218, originally rendered in green, are rendered in the same shade of gray. Furthermore, originally yellow pie wedges 222 are rendered as white and have, therefore, entirely disappeared from the chart 210.

Figure 3:
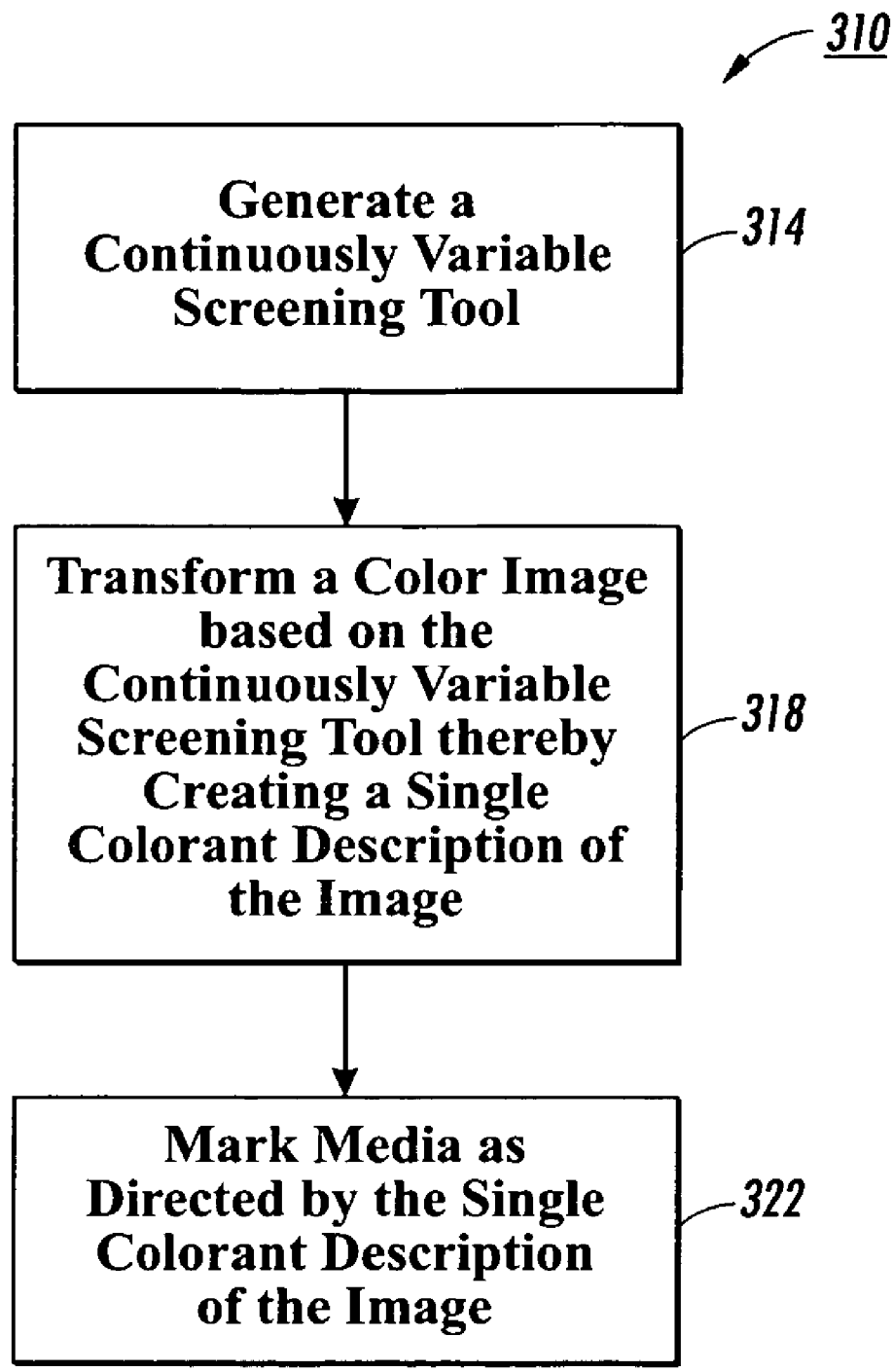
FIG. 3 is a flow chart outlining a method to preserve color information in a single colorant version of a multicolor image.

Referring to FIG. 3, a method 310 of generating a single colorant version of a color image, which does not suffer from the problems described in relation to FIG. 1 and FIG. 2, includes a continuously variable screening tool generation step 314. As will be explained in detail below, a continuously variable screening tool is a tool for applying a unique modulation or texture to an image based on variation in some aspect of the image. For example, a continuously variable screening tool associates a unique pattern to each unique hue and saturation in a color image. Each unique pattern is used as a substitute for color in a single colorant version of the color image. Of course, the definition of continuously variable depends on the architecture of the image processor on which the method is implemented. In purely analog image processing systems, the screening tool is continuously variable in the sense that the calculations required to generate the variable screening tool are carried out by analog multipliers, adders, comparators and the like. The infinite resolution provided by analog calculation generates a truly continuous screening tool. In digital image processors, continuity is judged in light of system resolution or quantization. Thus, in digital systems, the screening tool is continuous in the sense that there is a different screen pattern for every measurable or calculable hue and chromaticity in an image. In the continuous screening tool generation step 314, subtle differences in hue are reflected in subtle differences in screen pattern. Subtle changes in chromaticity or saturation are also reflected in subtle differences in screen pattern. The continuously variable screening tool can be predefined or it can be generated at run time. When generated at run time, screen patterns need only be calculated for colors that are present in an image being processed.

In an image transformation step 318, a single colorant description of a color image is created. It is to be appreciated that, preferably (and as described below), the generation step 314 and the transformation step 318 are sequentially performed on each pixel, on a pixel-by-pixel basis, such that the steps are repeated for each pixel. However, it would also be possible to first generate a screening tool for each pixel of the image, and then transform the image thereafter. The continuously variable screening tool is used to represent each hue and saturation with a unique pattern. Lightness is coded in, for example, the thickness or width of pattern components. As will be explained below, hue and chromaticity or saturation are coded, for example, as a mixture or blend of predefined patterns.

In a rendering step 322, media is marked as directed by the single colorant description of the image. Media includes any image-rendering medium. For example, media include paper, velum, and single color display devices such as, for example, black and white CRT's, Liquid Crystal Displays and monochrome monitors.

Figure 4:
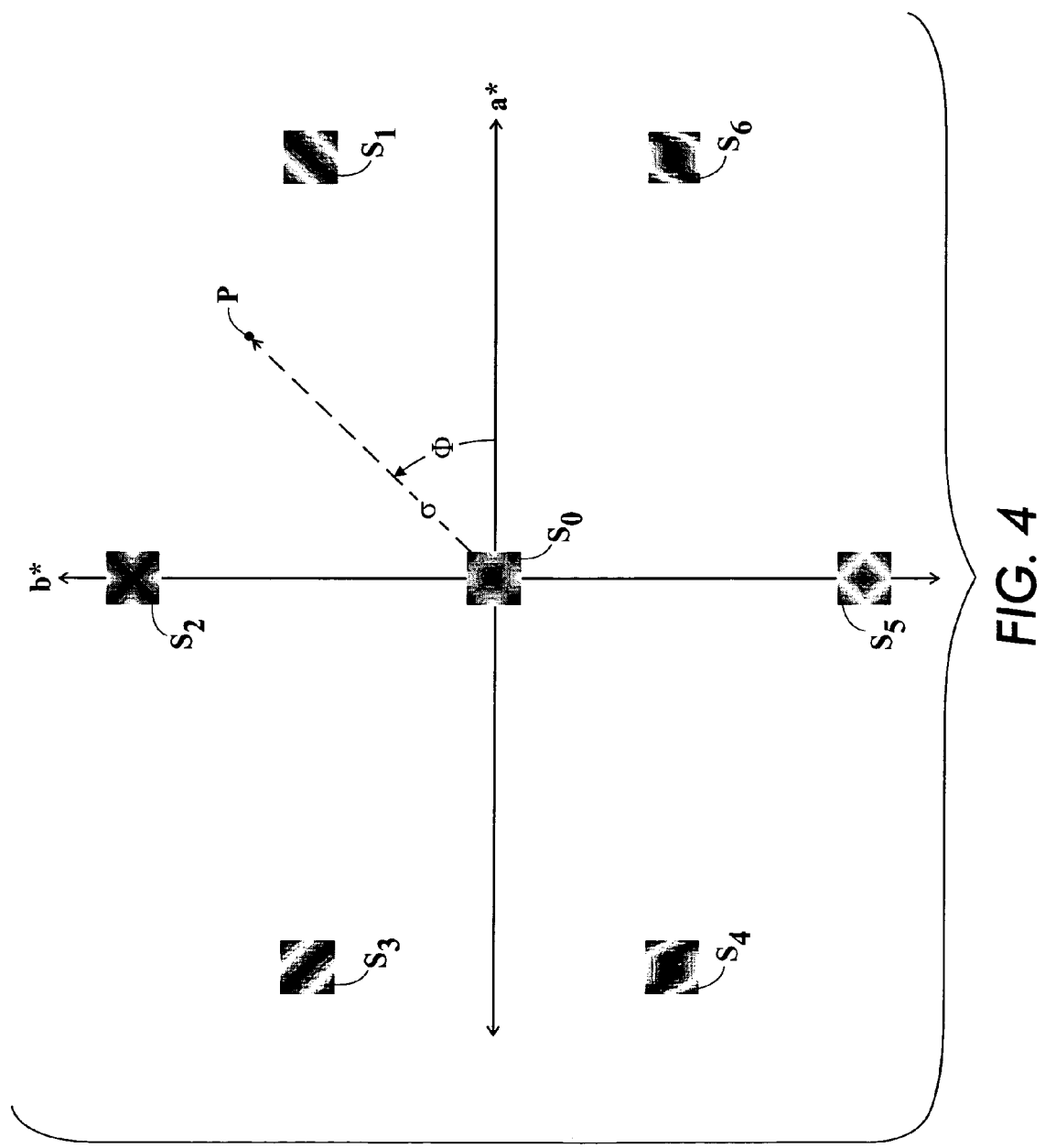
FIG. 4 is a chart showing reference screens, used in some embodiments, to carry out a step in the method of FIG. 3, the reference cells being distributed about a color space to show an assigned relationship between the reference screens and the color space.

In one implementation of the method 310 for generating a single colorant version of a color image, for calculation and analysis purposes, colors found in an image are located or mapped within a machine independent color space, such as, for example, the well known Commission International de l'Eclairage or International Commission on Illuminations L*a*b* color space (CIELAB). A plane sliced from the CIELAB color space is depicted in FIG. 4. Luminosity is indicated along an L* axis (not shown) through an origin or intersection of axes. The axes illustrated are labeled a* and b*. The L* axis extends into and out of the plane of the diagram. The a* and b* axes represent ranges of hue and saturation. A particular color P is located in the color space by its relationship to the three axes. For example, color P has a hue angle $\Phi$ measured from, for example, from the a* axis and a saturation $\sigma$, depicted as a radial distance from the origin. Color P is also associated with a luminance that is depicted as a height along the L axis. Changes in the luminance of P would move it to another luminance plane, either above or below the depicted plane. Also depicted in FIG. 4 are a set of reference screens or screen cells including a neutral screen $S_0$ and a plurality of hue dependant primary screens $S_1 \ldots S_6$. The reference screens are a set of predetermined, related pattern primitives that are used in the continuous screening tool generation step 314 as the basis or seeds for generating the rest of the continuous screening tool. Six primary screens are shown, but any number of primary screens may be used. Typically, the primary screens are stored in memory. Therefore, the number of primary screens used is a trade off between accuracy and calculation speed on the one hand and required memory on the other hand. The primary screens $S_1 \ldots S_6$ are shown as being evenly distributed around the outer edge of the color space. However, other distributions are possible. Primary screens are distributed in whatever manner is convenient for the purposes of performing blending calculations. The neutral screen $S_0$ shown is a high frequency 45-degree dot screen constructed from the product of two cosine functions. However, it is contemplated that other screens are suitable. The primary screens $S_1 \ldots S_6$ are hue dependent. The reference screens $S_0 \ldots S_6$ are related to each other at least in as much as they have at least some maxima and minima in the same locations.

For example, the set of reference screens $S_0 \ldots S_6$ is generated from the equations and algorithms described in the following C source code, wherein:

```
period = Screencell Size; */for example, 16/*
periodDiv2 = period/2;
amp = 127.5;
c1 = 2.0 * 3.1416/period;
the index i and j goes from 0 to period-1;
round( . . . ) denotes rounding the argument to an integer; and
rem(a,b) is the remainder of dividing a by b.
S0:neutral(i,j) = round(127.5 - amp *cos(c1*i) * cos(c1*j));
S1:red(i,j) = round(127.5 - amp*cos(c1*(j+i)));
S3:green(i,j) = round(127.5 - amp*cos(c1*(j-i)));
S6:magenta(i,j) = round(127.5 - amp*cos(c1*(j+i+4*sin(c1*j))));
S4:cyan(i,j) = round(127.5 - amp*cos(c1*(i-j-4*sin(c1*j))));
S5:blue(i,j) determined as follow:
    red = round(127.5 - amp*cos(c1*(j+i)));
    green = round(127.5 - amp*cos(c1*(j-i)));
    i1 = rem(i, period) - periodDiv2;
    j1 = rem(j, period) - periodDiv2;
    if(i1*j1 >=0)
        blue(i,i) = red;
    else
        blue(i,j) = green;
S2:yellow(i,j) determined as follow:
    red = round(127.5 - amp*cos(c1*(j+i)));
    green = round(127.5 - amp*cos(c1*(j-i)));j
    i1 = rem(i, period) - periodDiv2;
    j1 = rem(j, period) - periodDiv2;
    if(i1*j1 >=0)
        yellow(i,j) = green;
    else
        yellow(i,j) = red;
```

Referring to FIG. 5, numerical representations of the neutral screen $S_0$ and two primary screens $S_1$ and $S_2$ include threshold values 505 and relative dot position information 510. The screens each contain threshold values 505 for two hundred fifty six dots. The dots correspond to pixels in an image. Furthermore, the dots correspond to dot or mark positions in a rendering of the image. In the screens, the dots are grouped in, for example 16×16 arrays or grids. Other screen sizes are acceptable and contemplated. FIG. 5 includes column indexes 514 ranging from 1 to 16 and each screen is associated with a set of row indexes 518 ranging from 1 to 16. The relative dot position information is coded in the row 518 and column 514 indexes. In each screen $S_0$, $S_1$, $S_2$, dot locations (1,9) and (9,1) hold maximum threshold values, namely 255. Furthermore, at dot location (9,9) each screen holds minimum threshold values, namely 0. Whatever screens are used, it is preferable that each screen in the set has at least one maximum in a dot location where the other screens also have a maximum. Likewise, it is preferable that each screen in a set has at least one minimum threshold value at a dot location where the other screens in the set also have minimums. Maintaining this relationship between screens helps ensure smooth transitions in patterns as colors across an image make subtle variations. For example, maintaining this relationship ensures that subtle variations in flesh tones are depicted as subtle variations in halftone texture.

The patterns in FIG. 4 are created by comparing a reference value, for example 128, to the threshold values in the screens. For example, comparing a reference value to the thresholds in $S_0$ of FIG. 5 and placing a mark at a corresponding dot location on a piece of paper wherever the reference value is above the threshold creates the pattern of $S_0$ of FIG. 4. The center portion of each screen $S_0 \ldots S_6$ is dark because the threshold value in the center of each screen is zero. Therefore, any reference value greater that zero is above the threshold in the center of the screen and a mark is placed in the dot location corresponding to the center of the screen. Close inspection of FIG. 5 reveals that the higher the reference value is, the more marks will be placed and the darker and thicker the pattern will be. This would be appropriate where the pixel value being compared to the screens is pixel darkness. However, typically the value being compared to a screen threshold value is a pixel lightness or luminance, with increasing numerical values corresponding to brighter colors. Therefore, the sense of the marking operation is typically reversed with respect to the operation just described. In other words, typically marks are placed on print media when an image pixel value is below a screen threshold value. The result is that the patterns shown are inverted with respect to light and dark.

Examination of FIG. 4 and FIG. 5 also show that there are screens defined for only seven points in color space. While variations in lightness are accounted for automatically by the threshold patterns in the screens, there are still a multitude of colors for which screens are not defined. Those colors are accounted for, and the screen is made continuously variable by, calculating required screens, for example, by an image processor at run time, by blending or interpolating between the reference screens $S_0 \ldots S_6$. This process generates unique screens for hues and saturations not covered by the reference screens.

Any appropriate blending technique may be used. One technique is a two-step blending. First an intermediate or hue screen is calculated based on the equation:

$$Screen\_hue(\Phi)=(1-\alpha)*S_k+\alpha*S_{k+1} \quad (1)$$

Where k and k+1 are primary screen numbers of screens near a color or hue of interest. The screen numbers k and k+1 are selected so that $\Phi_k<\Phi<\Phi_{k+1}$, where $\Phi$ is the hue angle of the color of interest $\alpha$ is a weighting factor. Linear or nonlinear weighting factors may be used. For example, $\alpha$ is calculated from the equation:

$$\alpha=(\Phi-\Phi_k)/(\Phi_{k+1}-\Phi_k) \qquad (2)$$

Referring to FIG. 4, a color P has a hue angle $\Phi$ located between the hue angles of $S_1$ and $S_2$. Therefore, $\Phi_k<\Phi<\Phi_{k+1}$ is satisfied by k=1. For example, $\Phi=50$ degrees. $\Phi_k=30$ degrees and $\Phi_{k+1}=90$ degrees. Therefore $$\alpha=(50-30)/(90-30)=20/60=1/3 \qquad (3)$$

and:

$$Screen\_hue(\Phi)=(1-(1/3))*S_1+(1/3)*S_2=(2/3)*S_1+(1/3)*S_2 \qquad (4)$$

The color P is located in color space one third of the way between locations associated with $S_1$ and $S_2$. Therefore, the intermediate hue screen calculation is automatically weighted, by the structure of general equations (1) and (2), and as illustrated by example equations (3) and (4), so that the influence of $S_1$ is greater than the influence of $S_2$.

Next, the intermediate screen (Screen_hue($\Phi$)) is blended with the neutral screen. Again, a weighting factor is used. For example, a weighting factor based on some function of saturation $\sigma$ is used. Again, the weighting factor function can be linear or non-linear. This second blending step makes texture variation based on color saturation a component of the continuously variable screening tool. The neutral screen/intermediate screen blending is achieved by, for example, the equation:

$$Screen(\Phi,\sigma)=(1-w(\sigma))*S_0+w(\sigma)*Screen\_hue(\Phi) \qquad (5)$$

Referring to FIG. 6, an intermediate screen 610 includes a minimum at location (9,9) and a maximum at locations (1,9) and (9,1). The intermediate screen 610 is calculated based on equation (4). For example, with reference to FIG. 5, in primary screen $S_1$ the threshold value at grid location (3,2) is 79. In primary screen $S_2$ the threshold value at grid or dot location (3,2) is 10. Applying equation (4) leads to: (2/3)(79)+(1/3)(10)=56. Therefore, the threshold value in the intermediate screen 610 at location (3,2) is 56. The same process is repeated, as required, for each grid or dot location in the intermediate screen 610. Likewise, a final blend screen 620 is calculated based on equation (5) under the assumption that w($\sigma$)=2/3. For example, with reference to FIG. 5, in neutral screen $S_0$, the threshold value at grid location (3,2) is 44. In the intermediate screen 610 the threshold value at grid or dot location (3,2) is 56. Applying equation (5) leads to: (1/3)(44)+(2/3)(56)=52. Therefore, the threshold value in the final blend screen 620 at location (3,2) is 52. Again, the same process is repeated, as required, to calculate the threshold value for each grid or dot location in the final blend screen 620. It is noted that final blend screen 620 also includes a minimum at location (9,9) and a maximum at locations (1,9) and (9,1).

Figure 7:
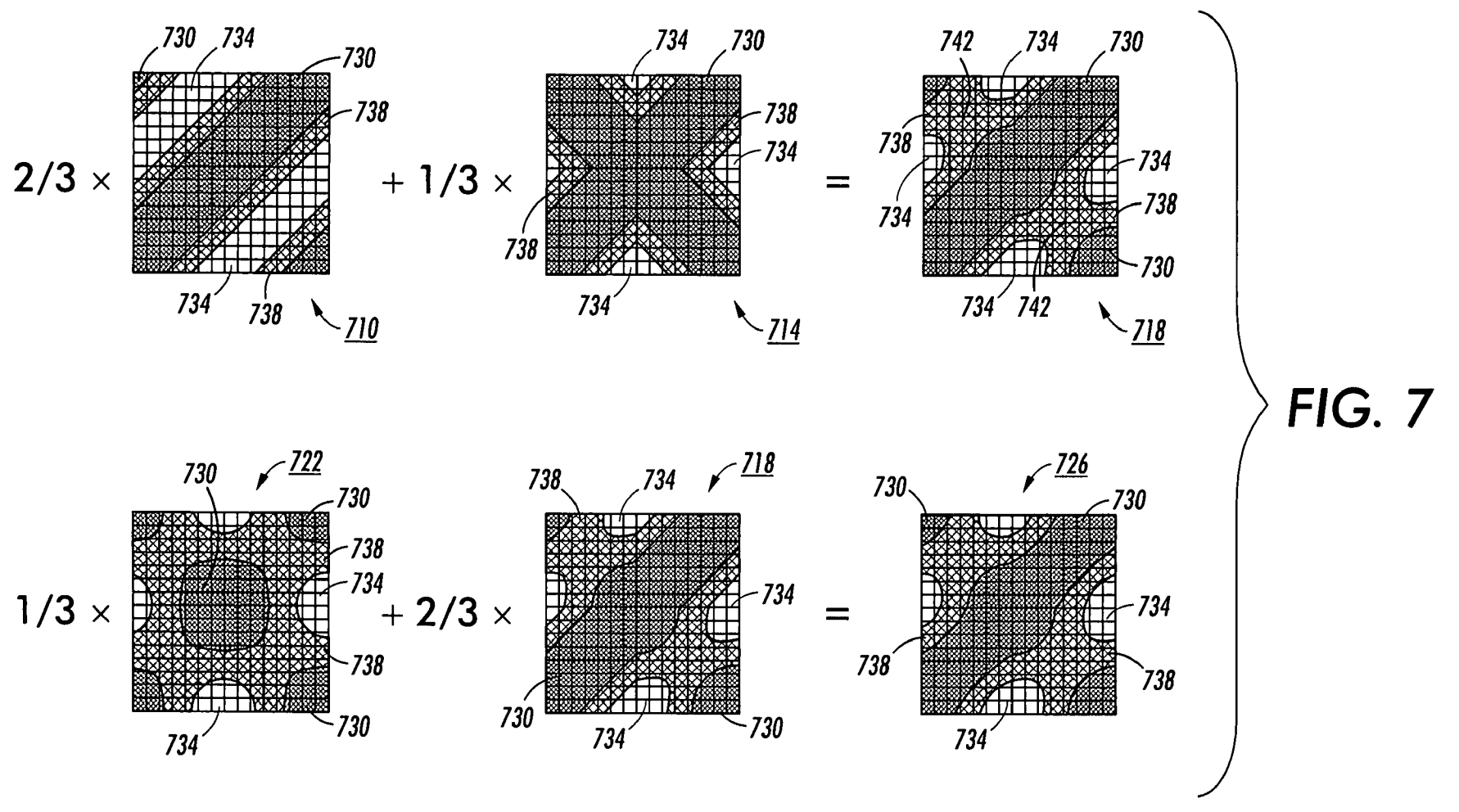

FIG. 7 illustrates the blending operation of equations (4) and (5) and FIG. 6 in graphical form. Primary screen $S_1$ 710 is multiplied by 2/3 and added to 1/3 of primary screen $S_2$ 714. The result of that calculation is an intermediate screen 718. Next, the neutral screen $S_0$ 722 is multiplied by 1/3 and added to 2/3 of the intermediate screen 718 resulting in a blend screen 726. Dark portions 730 of the cells 710, 714, 718, 722 represent low threshold values. Light portions 734 of the cells 710, 714, 718, 722 represent high threshold values. Gray portions 738 of the cells 710, 714, 718, 722 represent intermediate threshold values. The blending operation is quite clearly seen by examining primary screen $S_1$ 710, primary screen $S_2$ 714 and intermediate screen 718. In this example, a relatively heavy weighting factor of 2/3 multiplies primary screen $S_1$ 710. Therefore, the influence of primary screen $S_1$ 710 is quite strong in the intermediate screen 718. For example, the intermediate screen 718 and primary screen $S_1$ 710 both include three dark portions 730. The three dark portions in the intermediate screen 718, are generally in the same location and are approximately the same shape as the three dark portions 730 in primary screen $S_1$ 710. However, there are some important differences in the shape of the dark portions 730 in the intermediate screen 718. The influence of primary screen $S_2$ 714 on the intermediate screen 718 can be seen in these shape variations. For example, at points where primary screen $S_2$ 714 has dark portions 730 at grid or dot locations that correspond to gray portions 738 in primary screen $S_1$ 710, the intermediate screen has bulges or distortions in the dark portions 730. The influence of $S_2$ 714 is also apparent in gray regions 742 of the intermediate screen 718. The gray regions occur where dark portions 730 of primary cell $S_2$ 714 are blended with light portions of primary screen $S_1$ 710. Blending between the reference screens in a machine independent color space as described above generates a unique pattern corresponding to each unique color in the color space. As color changes from shade to shade, a new pattern is created corresponding to each shade. A continuous rainbow or color sweep is transformed into a continuum of shifting patterns.

Figure 8:
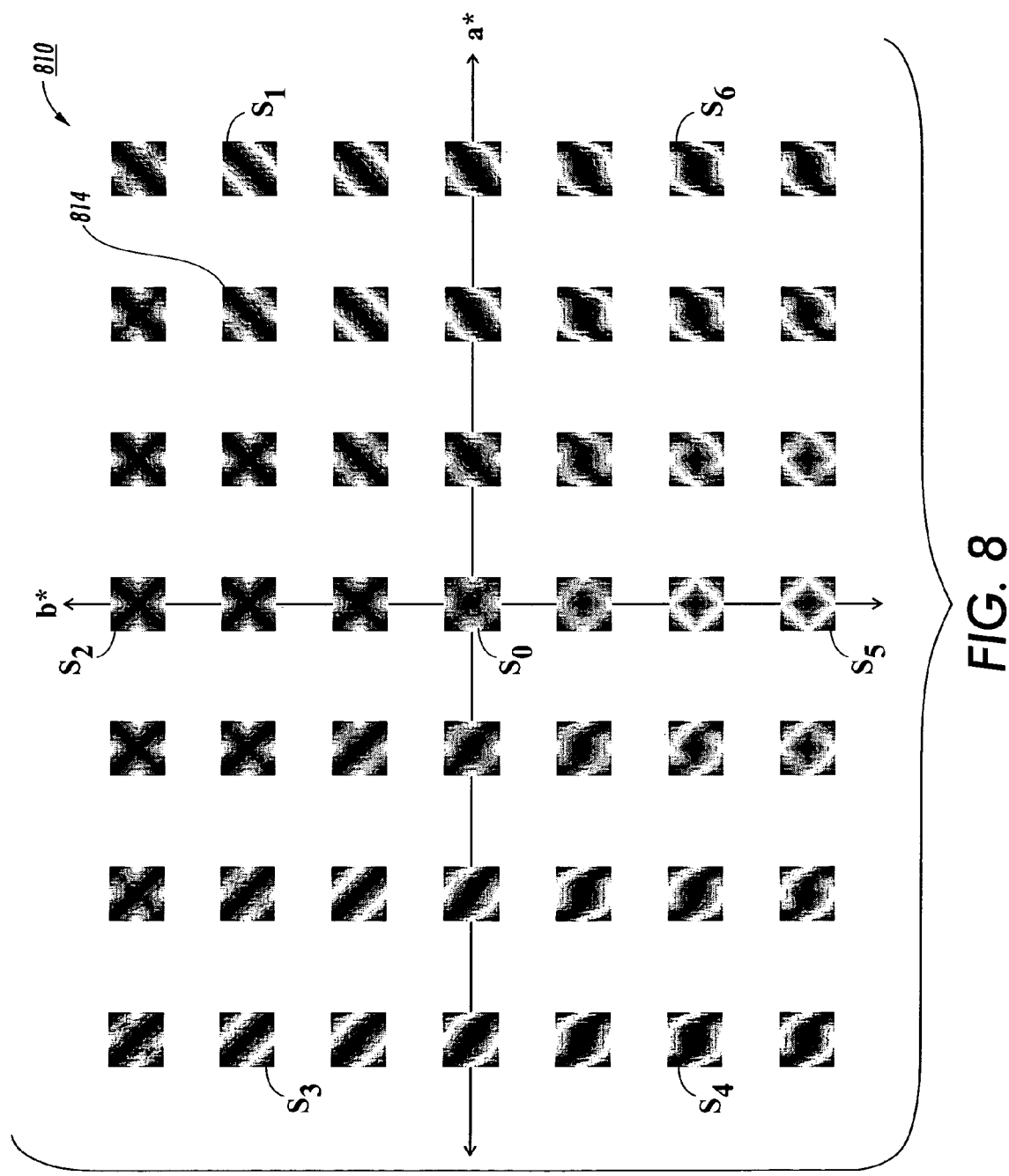
FIG. 8 is a chart showing the reference screens of FIG. 4 in relation to the color space of FIG. 4 and to a set of calculated blended screens.

Referring to FIG. 8, the original reference screens $S_0$ ... $S_6$ are shown in relation to the rest of a continuously variable screening tool 810. The continuously variable screening tool 810 is represented by a small sample set of calculated screens generated with the blending equations described above. A blended screen 814 is located in the a*b* plane approximately in the same location as color P (see FIG. 4). Therefore the blended screen 814 is very similar to the blended screen 620, 726 of FIG. 6 and FIG. 7.

While the described system varies the screen as a function of hue and saturation, continuously variable screening tools can be functions of other color description parameters. The choice is limited only by the parameters that describe the color space in which one chooses to work.

Any convenient screen dimension can be used. For example, screens containing screens with dimensions of 10 dots×10 dots, 12 dots×12 dots and 16 dots×16 dots are common. Cell dimensions are chosen for the usual reasons of spatial and gray level resolution.

In operation, for example, during the image transformation step 318, a color image can be thought of as being overlaid with an array of generic screens. This effectively assigns each pixel in the color image to a particular dot position within a screen. For example, some pixels are assigned dot or grid location (3,2). Other pixels are assigned dot location (9,9) and so on and so forth for all the available dot locations (depending on the size of the screens). Each pixel is analyzed and is associated with one of the reference screens or with a screen that is calculated from an interpolation or blend of the reference screens (in, for example, step 314 for that pixel). For example, equation (1) and equation (5), described above, are used to calculate a screen for a pixel base on a hue and a saturation described by the pixel. A pixel value, for example, a pixel lightness or luminance, is then compared to the threshold value corresponding to the dot location assigned to the pixel. If the pixel value is below (or above, depending on the system) the threshold value a mark will be placed on a media. Of course, the media can be any image storage device or rendering media. For example, a mark or bit can be set in an electronic storage device, a dot can be printed on a piece of paper, or a pixel location can be made dark (or light) on a monochrome monitor. Of course, it is not necessary to generate an entire calculated screen. It is only necessary to calculate the threshold value associated with the dot location assigned to the pixel of interest. For example, if the pixel is assigned dot location (3,2) then it is only necessary to use equations (1) and (5) to calculate a threshold value for dot location (3,2). Alternatively an entire screen may be calculated and stored for use with other similar pixels.

Indeed, any number of implementations are possible. Implementations range from memory intensive, continuous screening tool precalculation and look up table generation and storage schemes, to a calculation intensive, on the fly screen calculation techniques. Image processors can range from analog and/or digital computer implementations to fuzzy logic or neural network implementation.

Figure 9:
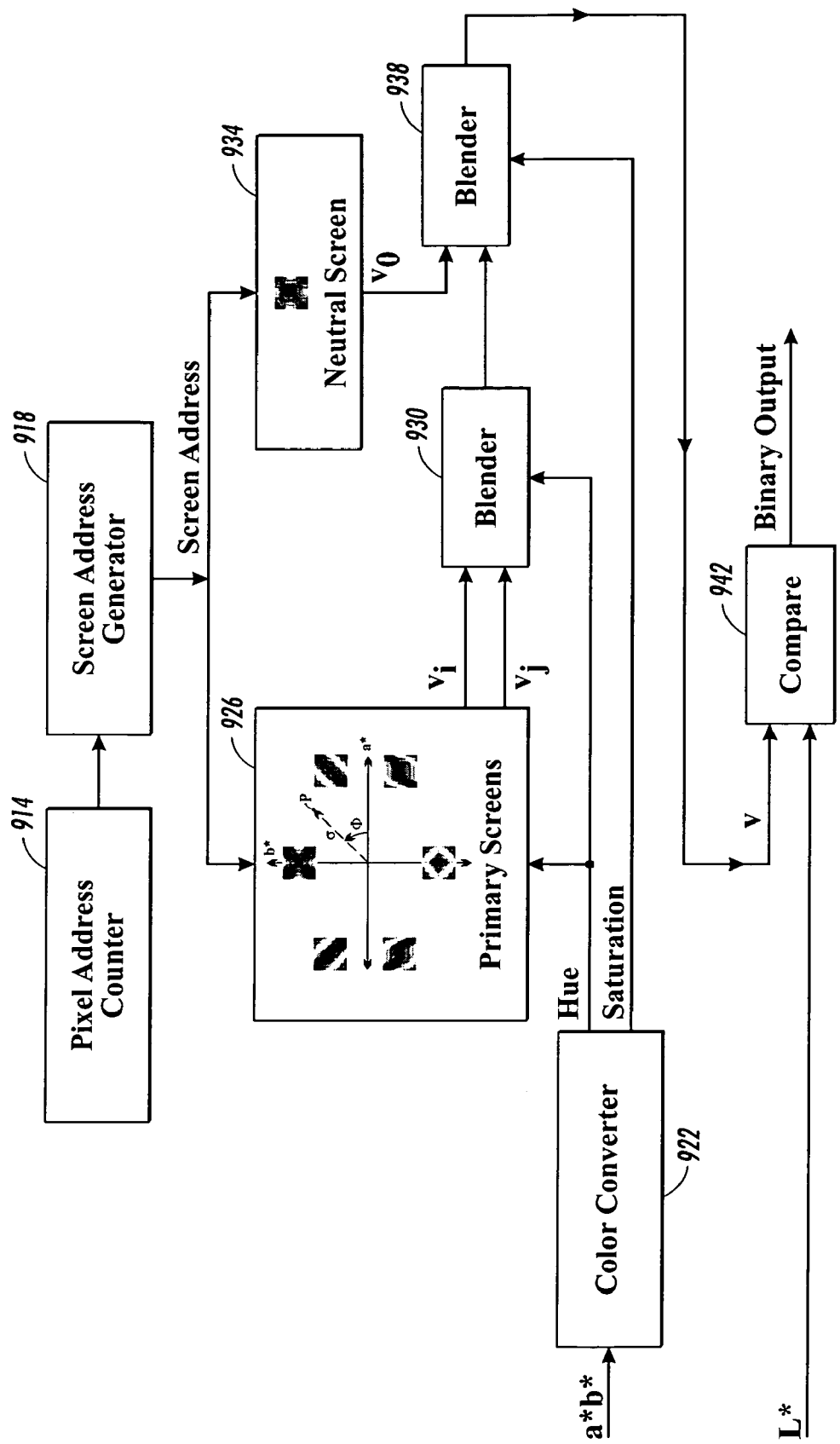
FIG. 9 is a block diagram illustrating processing flow in an embodiment of the method of FIG. 3.

Referring to FIG. 9, preferably, when an embodiment uses on the fly screen blending, blending is done one dot location at a time. For example, a pixel address counter 914 generates an image address for an image pixel. A screen address generator 918 receives the image address and relates it to a screen dot location 510 using modular arithmetics. For example, a scanline number and a pixel position within a scanline are used to determine that the image pixel is related to, for instance, screen dot position (7,13). Where necessary, a color converter 922 is used to determine convenient pixel values from available pixel values. For example, a*b* values of the image pixel addressed by the pixel address counter 914, are converted to more convenient hue and saturation values. A set of primary screens 926 is accessed. As described in reference to equation (1), the pixel hue value is used to select two of the primary screens 926 for blending. Additionally, the screen dot location generated by the screen address generator 918 is used to select appropriate screen threshold values from the selected screens. For example, the threshold values from dot locations (7,13) from both $S_i$ and $S_j$ are selected for blending in a first blender 930. In FIG. 9, those threshold values are denoted as $v_i$ and $v_j$. As described in reference to equation (2), the pixel hue value is also used by the first blender 930, to calculate weighing factors for each of the selected screens. The screen dot location is use to select an appropriate screen threshold value from a neutral screen 934. For example, the screen threshold value from location (7,13) of $S_0$ is selected for blending. In FIG. 9, that threshold value is denoted as $v_0$. An intermediately blended threshold value is delivered from the first blender 930 to a second blender 938. As described in reference to equation (5), the pixel saturation value is used, by the second blender 938, to calculate weighing factors for the intermediate threshold value and the neutral screen $S_0$ threshold value. The output of the second blender is a final continuous screening tool threshold value. In FIG. 9, the final continuous screening tool threshold value is denoted v. An image pixel luminance value L* is compared to the final continuous screening tool threshold value in a comparator 942. The output of the comparator 942 is a binary output. The binary output indicates whether or not a mark is to be generated as the transform of the image pixel. This procedure is repeated for every image pixel in the image.

Figure 10:
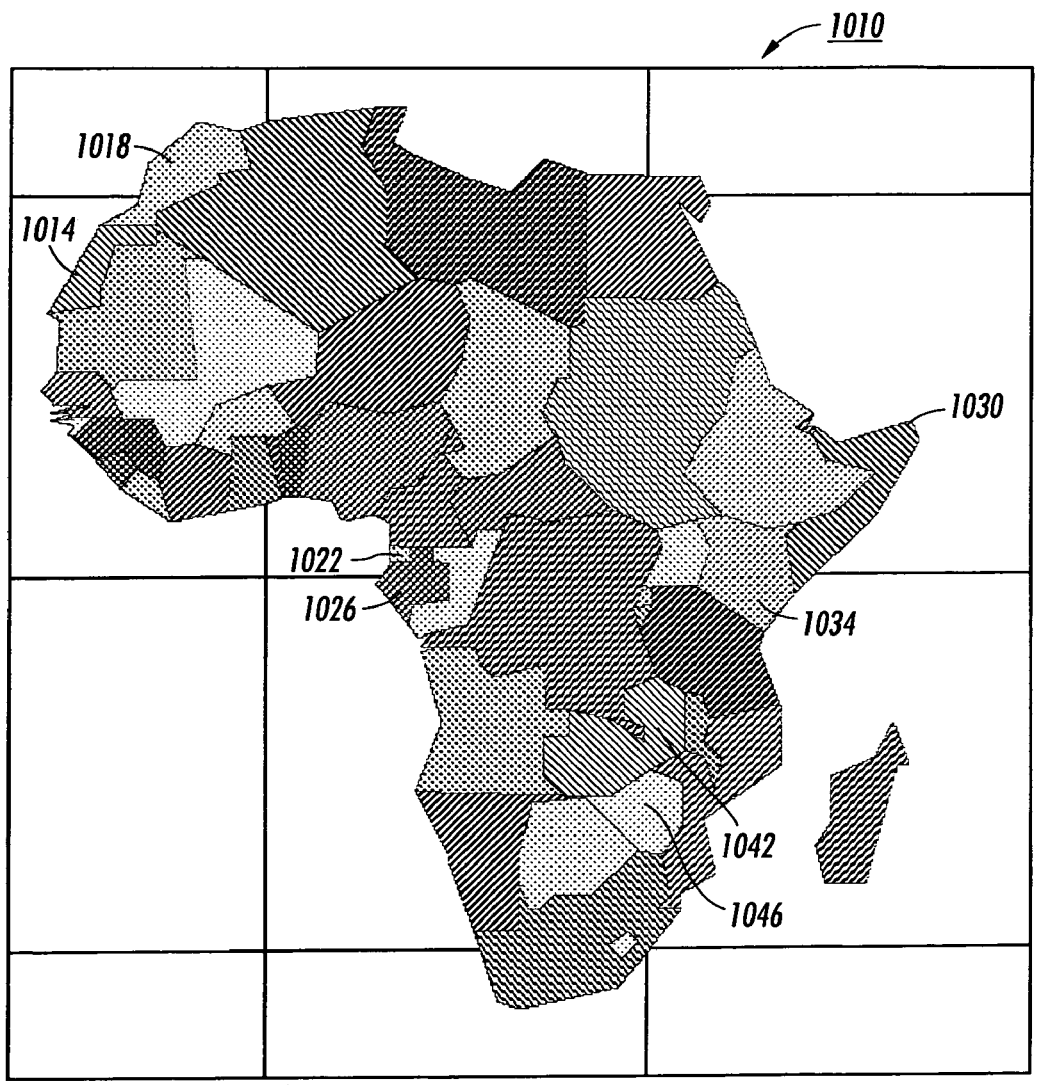
FIG. 10 is a black and white version of a color map rendered by the method outlined in FIG. 3.

Referring to FIG. 10, the method 310 of generating a single colorant version of a color image of FIG. 3 is used to transform (step 318) the color map of Africa (not shown), mentioned in reference to FIG. 1. The color map of Africa is rendered (step 322) as a textured black and white map of Africa 1010. In contrast to the prior art black and white map of Africa 110, in the textured map of Africa 1010 the Western Sahara 1014 is clearly distinguishable from Morocco 918. Furthermore, Equatorial Guinea 1022 is clearly separate from its neighbor Gabon 1026. Additionally, Somalia 1030 and Kenya 1034 are rendered with textures as distinct from one another as their original green and pink colors. Similarly, Zambia 1042 and Zimbabwe 1046 are properly rendered as separate countries.

Figure 11:
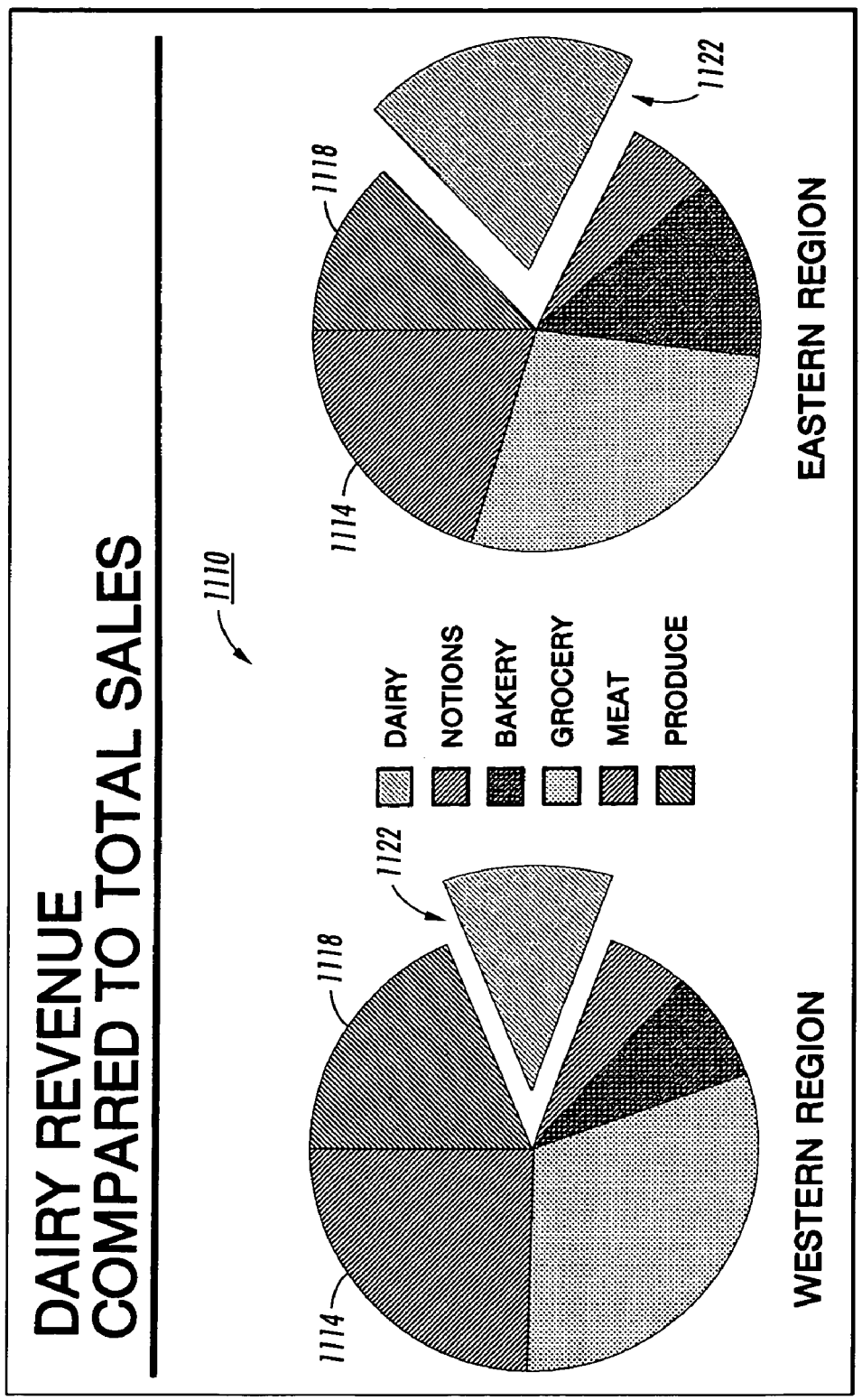
FIG. 11 is a black and white version of a color pie chart rendered by the method outlined in FIG. 3.

Referring to FIG. 11, in contrast to the prior art image processor, which failed to distinctly transform primary colors in the pie chart 210 shown in FIG. 2, in a textured black and white pie chart 1110 first pie wedges 1114, created as red and second pie wedges 1118, created as green, are rendered with distinct patterns. Furthermore, originally yellow pie wedges 1122, which are not visible in the prior art pie chart 210, are clearly visible and rendered with a third pattern.

Figure 12:
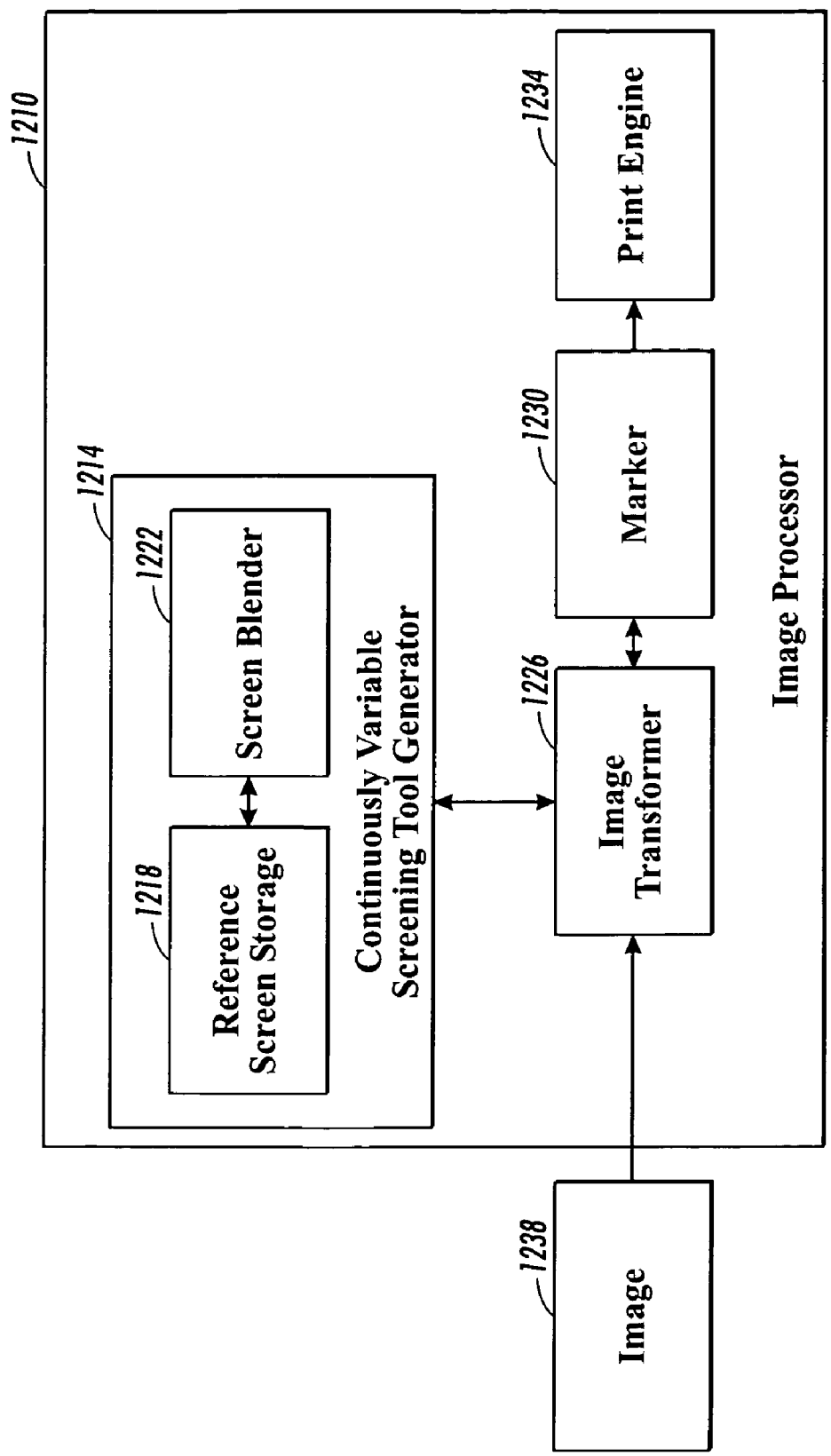
FIG. 12 is a block diagram of an image processor operative to carry out the method of FIG. 3.

Referring now to FIG. 12, an image processor 1210 operative to transform a multicolor image into a textured single colorant version comprises a continuously variable screening tool generator 1214. The continuously variable screening tool generator 1214 is operative to generate a different screen texture for every hue in the multicolor image. For example, the continuously variable screening tool generator 1214 operates during the screen generation step 310. Preferably, the continuously variable screening tool generator 1214 generates textures that are related to hue, so that similar hues are mapped to similar textures. Continuously variable screening tool generators are implemented in a wide variety of ways. One continuously variable screening tool generator comprises a reference screen storage device 1218 and a screen blender 1222. The reference screen storage device 1218 can be any convenient pattern storage mechanism. In an analog system, the reference screen storage device 1218 is, for example, a plurality test pattern generator circuits. Each test pattern generator circuit is configured to produce a different pattern. In a digital system, the reference screen storage device 1218 is typically a microprocessor or computer memory. However, other implementations are possible. For example, the reference screen storage device 1218 can be a rotating media such as a hard disk or a CD ROM. Additionally, reference screens can be stored and retrieved over a communications link, such as, for example a computer network. As indicated above, those skilled in the art will immediately understand that a screen blender 1222 can also be implemented in a wide variety of ways. In an analog system, a screen blender 1222 is, for example, comprised of a plurality of amplifiers and adder circuits. The gain of the amplifiers is varied in accordance with appropriate weighing factors in order to vary the contribution of the test pattern generation circuits being blended. The adder circuits combine the thus modified test pattern signals to produce the blended screening signal. In digital systems, the blending equations described above are implemented in software modules. A microprocessor, digital signal processor, or other computing device executes the modules to examine color image pixels and select the appropriate reference screens. Additionally, the appropriate weighting factors are calculated and applied to the selected reference screens. In other implementations, an application specific integrated circuit or programmable gate array is developed or configured to carry out some or all of the functions of the reference screen storage device 1218 and the screen blender 1222. Alternatively, neural networks are trained to generate black and white screen patterns in response to color pixel input stimulation.

The exemplary image processor 1210 further comprises an image transformer 1226, a marker 1230 and a print engine 1234. The image transformer is operative to perform image transformation step 318. The image transformer 1226 receives an image 1238 and examines pixels that comprise the image. Where necessary, the image transformer 1226 first transforms the image into a color space that is compatible with the continuous screening tool. For example, the image transformer may convert an image from an RGB color space to a CIELAB color space. The image transformer 1226 uses a location of a pixel within the image as well as pixel values from the pixel to address an appropriate screen and dot location within the continuous screening tool. The image transformer 1226 communicates with the continuous screening tool generator 1214 to retrieve a threshold value from the addressed dot location. For example, the image transformer 1226 uses a hue angle value from the pixel to address a screen and uses a pixel location within the image to address a dot location. The image transformer 1226 compares the retrieved threshold value with a pixel value from the pixel and determines whether or not a mark should be place for the pixel. For example, the image transformer compares a pixel lightness with the retrieved threshold. The image transformer 1226 repeats this process for every pixel in the image to generate a single colorant version of the image that preserves color information in the form of texture.

The foregoing image transformer description is directed toward a digital implementation. However, image transformers can be implemented in any number of ways. For example, in one analog implementation of an image transformer, a screen signal, generated by an analog continuously variable screening tool generator, is delivered to a first input of a comparator circuit and used as a reference. An image signal, synchronized to the screening signal, is delivered to a second input of the comparator circuit. The comparator circuit outputs a mark signal based on a comparison between the signals on the two inputs of the comparator.

In general, the single colorant version of the image is passed to the marker 1230. The marker 1230 is a print engine controller. The marker 1230 uses the single colorant version of the image as a basis for sending mark signals to the print engine 1234. Typically, the marker 1230 is particularly adapted to communicate with and control a particular kind of print engine 1234.

The print engine 1234 can be any image-rendering device. Preferably the print engine 1234 is a single colorant image-rendering device, such as, for example, a black and white xerographic printer. A xerographic printer is known by those skilled in the art to comprise, for example, a fuser, a developer, and an imaging member. Alternatively, the print engine 1234 may include any other image-rendering device, such as, for example, an ink jet printer, a cathode ray tube, a monochrome monitor, or a laser printer.

In some implementations, the functions of the continuously variable screening tool generator 1214, image transformer 1226 and marker 1230 are combined or performed by other devices. The architecture illustrated in FIG. 12 is only exemplary and is not meant to limit the invention. For example, as described above, in some analog implementations a comparator provides the majority of the functions of an image transformer and a marker.

The invention has been described with reference to particular embodiments. Modifications and alterations will occur to others upon reading and understanding this specification. For example, the invention can be implemented using a color space other than the CIELAB color space. More or fewer reference screens can be used. Other reference screen patterns can be used. Reference screens do not have to be distributed about the outer edge of the color space. Blending or interpolation can be based on parameters other than hue angle and saturation. Many other image processor implementations are contemplated for using a continuously variable screening tool to generate single colorant versions of color images. Hardware, software, neural networks, application specific integrated circuits, programmable gate arrays and a host of other technologies can be used to implement versions of the image processor. It is intended that all such modifications and alterations are included insofar as they come within the scope of the appended claims or equivalents thereof.

What is claimed is:

1. A method for rendering an image, described in a multi-colorant color space, in a single-colorant color space, the method comprising:

generating a continuously variable screening tool operative to provide a texture corresponding to each hue and saturation in the multi-colorant color space, and transforming the multi-colorant description of the image based on the continuously variable screening tool thereby creating a single-colorant description of the image.

2. The method of claim 1 wherein generating a continuously variable screening tool further comprises:

defining a neutral screen associated with neutral color;

defining a plurality of primary screens associated with a plurality of hues from the multi-colorant color space.

3. The method of claim 2 further comprising generating a set of blended screens associated with a set of remaining hues by performing a weighted blend between nearby screens.

4. The method of claim 3 wherein generating a set of blended screens further comprises:

blending between two primary screens to generate an intermediate screen screen hue($\Phi$) using the equation:

$$Screen\_hue(\Phi)=(1-\alpha)*S_k+\alpha*S_{k+1}$$

where $\Phi$ is a hue angle of a pixel being transformed, k is an index indicating one of the primary screens, k+1 indicates another primary screen such that $\Phi_k<\Phi<\Phi_{k+1}$, where $\Phi_k$ and $\Phi_{k+1}$ are hue angles associated with the primary screens $S_k$ and $S_{k+1}$, respectively and where $$\alpha=(\Phi-\Phi_k)/(\Phi_{k+1}-\Phi_k).$$

5. The method of claim 4 wherein generating a blended screen further comprises:

blending between a neutral screen and the intermediate screen Screen_hue($\Phi$) to generate a blended screen screen($\Phi,\sigma$) using the equation:

$$screen(\Phi,\sigma)=(1-w(\sigma))S_0+w(\sigma)Screen\_hue(\Phi)))$$

where $S_0$ is the neutral screen, and $w(\sigma)$ is a function of saturation $\sigma$ having a value between 0 and 1.

6. The method of claim 3 wherein generating a blended screen further comprises blending between a primary screen and the neutral screen.

7. The method of claim 1 further comprising:

marking media as directed by the single-colorant description of the image.

8. The method of claim 7 wherein marking media further comprises:
comparing a luminance of a pixel from the image with an associated screen value and placing a mark on the media if the luminance value is above the screen value.

9. The method of claim 7 wherein marking media further comprises comparing a luminance of a pixel from the image with an associated screen value and placing a mark on the media if the luminance value is below the screen value.

10. The method of claim 2 wherein defining a neutral screen further comprises generating a screen based on the product of two cosine functions.

11. The method of claim 2 wherein generating a neutral screen further comprises generating a high frequency dot screen.

12. The method of claim 2 wherein generating a neutral screen further comprises generating a forty-five degree high frequency dot screen.

13. The method of claim 2 wherein generating a plurality of primary screens further comprises generating a plurality of hue dependent screens, each of the plurality of screens having at least one common dot location for a maxima and at least one common dot location for a minima.

14. An image processor operative to render a single colorant version of a multicolor image, the image processor comprising:
a continuously variable screening tool generator operative to generate a different texture screen for every hue and saturation in the multicolor image.

15. The image processor of claim 14 wherein the image processor is a reprographic image processor.

16. The image processor of claim 14 wherein the image processor is a general-purpose computing device.

17. The image processor of claim 14 wherein the image processor is a business graphic authoring device.

18. The image processor of claim 14 wherein the continuously variable screening tool generator further comprises:
a reference screen storage device operative to store a set of predetermined reference screen patterns in association with locations within a color space; and
a screen blender operative to access the screen storage device and use the reference screens to calculate screen patterns for colors in the multicolor image that do correspond to locations in the color space that are different than the locations in the color space associated with the reference screens.

19. An image processor operative to render a single colorant version of a multicolor image, the image processor comprising:
a print engine;
a continuously variable screening tool generator operative to generate a different screen for every hue and saturation in the multicolor image;
an image transformer operative to apply the different generated screens in transforming the multicolor image to generate a single colorant version of the image;
a marker operative to use the single colorant version of the image as a basis for controlling the print engine to render the single colorant version of the image.

20. The image processor of claim 19 wherein the print engine is a xerographic printer.

* * * * *